United States Patent [19]
Hennig

[11] Patent Number: 5,095,951
[45] Date of Patent: Mar. 17, 1992

[54] ENERGY-CONDUCTING HOSE

[75] Inventor: Kurt Hennig, Munich, Fed. Rep. of Germany

[73] Assignee: Gebr. Hennig GmbH, Fed. Rep. of Germany

[21] Appl. No.: 597,175

[22] Filed: Oct. 15, 1990

[51] Int. Cl.⁵ ............................................. F16L 11/18
[52] U.S. Cl. ..................................... 138/120; 138/92; 174/101
[58] Field of Search .................... 138/92, 120, 155; 174/101

[56] References Cited

U.S. PATENT DOCUMENTS

| | | | |
|---|---|---|---|
| 3,197,954 | 8/1965 | Merker et al. | 138/120 |
| 3,330,105 | 7/1967 | Weber | 138/120 |
| 4,111,236 | 9/1978 | Moritz | 138/120 |
| 4,669,507 | 6/1987 | Moritz | 138/92 |
| 4,702,281 | 10/1987 | Moritz | 138/120 |
| 4,727,908 | 3/1988 | Forster | 138/120 |
| 4,814,071 | 3/1989 | Lower | 138/120 |

FOREIGN PATENT DOCUMENTS

| | | | |
|---|---|---|---|
| 653124 | 2/1963 | Italy | 138/120 |
| 2011576 | 7/1979 | United Kingdom | 138/120 |

Primary Examiner—James E. Bryant, III
Attorney, Agent, or Firm—Hopkins & Thomas

[57] ABSTRACT

The invention relates to an energy-conducting hose, the hose body (1) being formed by a plurality of C-shaped hose elements (2) and having a slot (3) which runs in the longitudinal direction of the hose. The slot is releasably closed by a cover (6) which consists of individual cover elements (7) which are each provided in the region of the two slot edges (3) with a recess (7a) intended for retaining and guiding the cover elements (7) on the hose body (1). Such an energy-conducting hose is distinguished by economical production, a high degree of rigidity and stability and by advantages in use.

14 Claims, 3 Drawing Sheets

ENERGY-CONDUCTING HOSE

BACKGROUND OF THE INVENTION

The invention relates to an energy-conducting hose which is bendable from an extended position to a curved position and consists of C-shaped hose elements which are movable relative to one another and which has a slot running in the longitudinal direction of the hose. A cover is movably mounted to the slot edges and releasably closes the slot.

Energy-conducting hoses of this type are used to receive electrical or hydraulic conduits which are arranged between movable and stationary machine parts.

An energy-conducting hose of the prior art is known for example from EP-A-259 725. In this case the cover which releasably closes the slot is formed by a cover band which extends over the entire length of the slot and is releasably connected to the C-shaped hose elements by clamps which are provided on one side of the cover band and in the region of the slot edges engage with the C-shaped hose elements.

Furthermore, the subject matter of the earlier German Patent Application P 38 23 609.5 is an energy-conducting hose, in which the cover is also formed by a band which is guided in the region of the two slot edges in two profile strips which on the one hand have an inner groove which is open towards the slot in the hose body and into which the cover band can be pushed, and on the other hand are provided with an outer groove in which the free ends of the C-shaped hose elements engage.

Finally, the subject matter of the earlier German Patent Application P 39 14 140.3 is an energy-conducting hose in which a locking band is arranged in the region of each of the two slot edges, is firmly connected to at least some hose elements and serves to stabilize the position and shape of the hose body formed by the C-shaped hose elements before the insertion or after the release of the cover band.

SUMMARY OF THE INVENTION

The present invention comprises an energy conducting hose of the type used for carrying energy and hydraulic lines between a fixed connection and a movable consuming device. Briefly described, the present invention comprises an energy conducting hose having individual C-shaped hose elements which form a hose body. Such C-shaped elements are shaped in such a manner whereby adjacent hose elements are movable relative to one another, are engaged to one another, and provide a continuous hose body.

The object of the invention is to make further developments to the energy-conducting hose of the prior art so that the manufacture and assembly are simplified, the stability and rigidity of the hose are increased and the ease of use is improved.

Other objects, features and advantages of this invention will be understood from reading the following specification in conjunction with the accompanying drawings.

BRIEF DESCRIPTION OF THE DRAWINGS

Some embodiments of the invention are illustrated in the drawings, in which.

DETAILED DESCRIPTION

Figure 1:
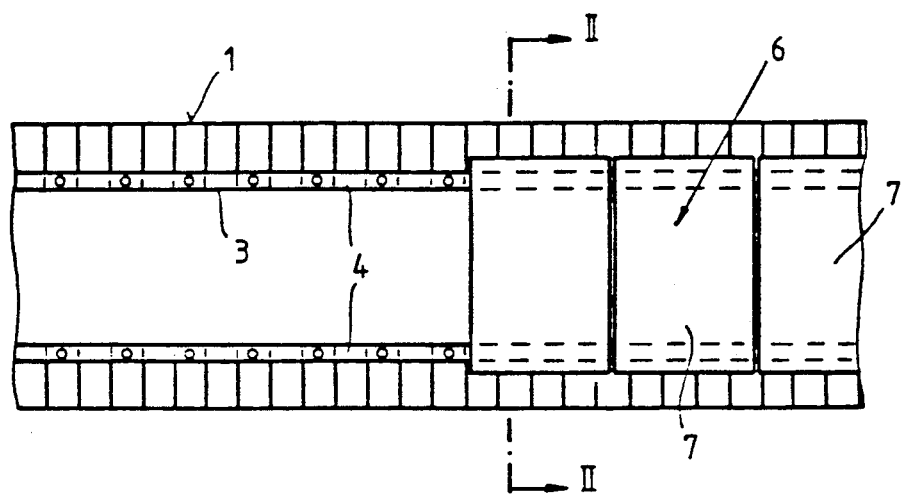
FIG. 1 shows a schematic top view of a part of the energy-conducting hose according to the invention.
Figure 2:
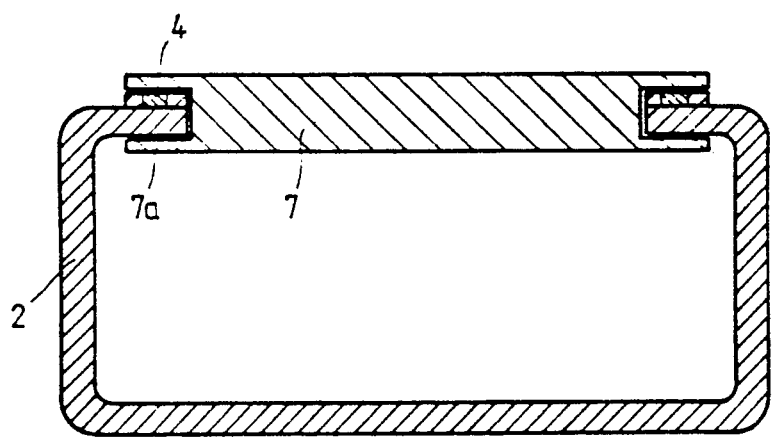
FIG. 2 shows a section along the line II—II in FIG. 1.
Figure 6:
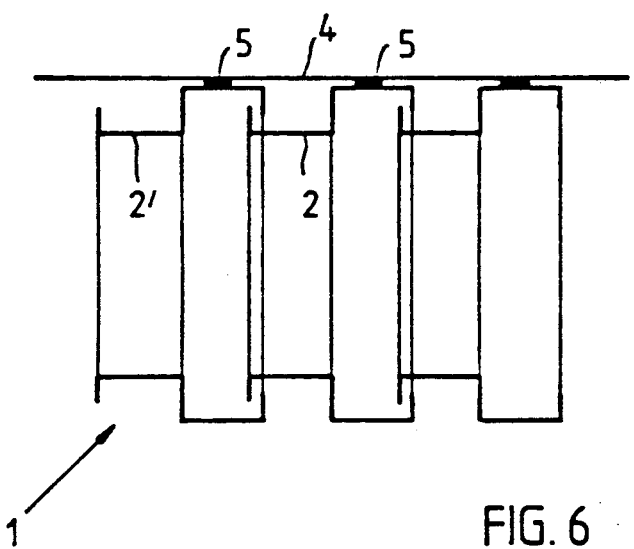
FIG. 6 shows a longitudinal section through a first embodiment of a hose body.

The energy-conducting hose illustrated in FIGS. 1, 2 and 6 comprises a hose body 1 which can be bent between an extended position and a maximum curved position, consisting of C-shaped hose elements 2 which are movable relative to one another and has a slot 3 running in the longitudinal direction of the hose.

In the embodiment illustrated in FIGS. 1, 2 and 6 the hose elements 2 have an essentially S-shaped cross-sectional profile in the longitudinal direction, and adjacent hose elements 2 and 2' engaging one another in the manner shown in FIG. 6.

In the region of each of the two edges of the slot 3 a locking band 4 is provided which is firmly connected at least to some hose elements—preferably by spot-welded connections 5—and thus fixes the extended position of the hose body 1 on the side of the hose body provided with the slot 3. Accordingly, in the embodiment illustrated in FIGS. 1, 2 and 6 the hose elements 2 can move relative to one another on the underside of the hose body 1 opposite the locking bands 4, so that the hose body assumes a more or less curved shape.

In the embodiment illustrated in FIG. 6 the extended position of the hose body is fixed by the locking bands 4, which results in the lowest possible material consumption for the hose body. However, as a variant of this it is also possible to fix the compressed position of the hose body in the region of the edges of the slot 3 with the locking bands 4. In this case it is possible for the hose body to be curved in the opposite direction, so that the locking bands 4 lie on the inside of the curve.

The energy-conducting lines can be freely inserted into or withdrawn from the hollow space formed by the hose body 1 through the open slot 3. After the introduction of the energy-conducting lines into the hose body 1 the slot 3 can be closed by means of a cover 6 which according to the invention no longer consists—as was usual in the past—of one continuous band running over the entire length of the hose, but of individual cover elements 7 which succeed one another in the longitudinal direction of the energy-conducting hose and which—as will be explained below with the aid of FIGS. 2 and 3—are each provided in the region of the two edges of the slot 3 with a recess intended for retaining and guiding the cover elements 7 on the hose body 1.

Thus in the embodiment illustrated in FIG. 2 recesses 7a are provided on the two outer narrow sides of the cover elements 7 facing the edges of the slot 3, these recesses opening on the two outer narrow sides and serving for engagement of the edge regions of the C-shaped hose elements 2 which are provided with the locking bands 4.

Figure 3:
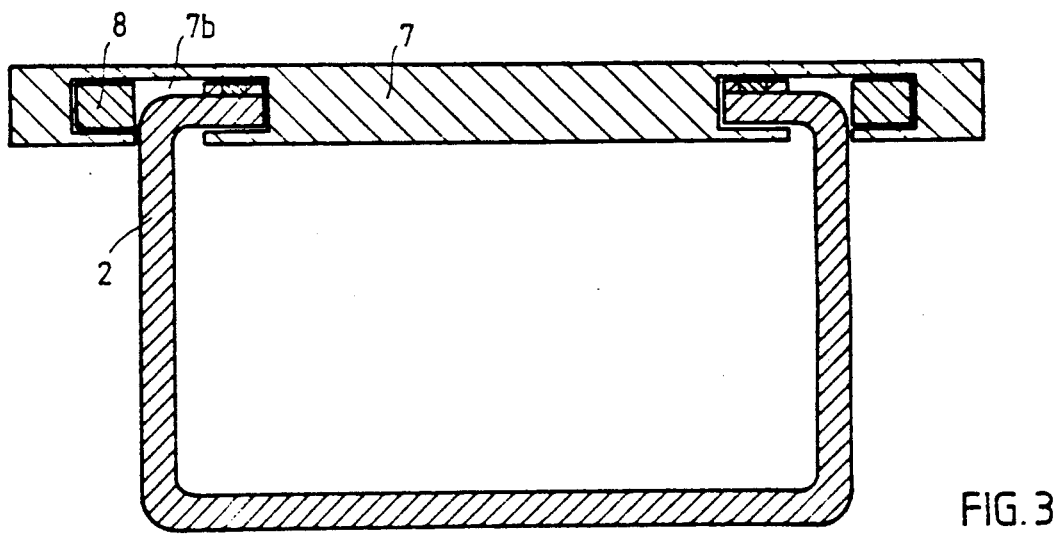
FIG. 3 shows a section corresponding to FIG. 2 through a variant.

In the variant illustrated in FIG. 3, by contrast, recesses 7b which open on the broad side of the cover elements 7 face the interior of the hose body 1 and are approximately T-shaped and are provided on the broad side of the cover elements. In this case the entire upper region of the C-shaped hose elements 2 engages in these recesses 7b, and for improved guiding, a part of the recess 7b can be lined with sliding material 8.

In the embodiment according to FIG. 3 the cover elements 7 have a width measured in the cross direction of the hose body 1 which is greater than the width of the hose body 1 so that the cover elements 7 project like a roof over the hose body 1. In this way the deeper areas (cf. FIG. 6) on the outside between adjacent hose elements 2, 2' are largely protected by the wider cover element 7 in practical operation against the penetration of shavings and other foreign bodies.

The individual cover elements 7 can be arranged freely, i.e. not joined to one another, adjacent one another, and in this case they are pushed in individually on closing of the slot 3 or drawn out individually on opening.

A construction is particularly advantageous in which the individual cover elements 7 are connected to one another so as to be capable of limited swivelling movement, preferably connected by means of a cylindrical coupling boss and a hollow cylindrical coupling socket.

Figure 4:
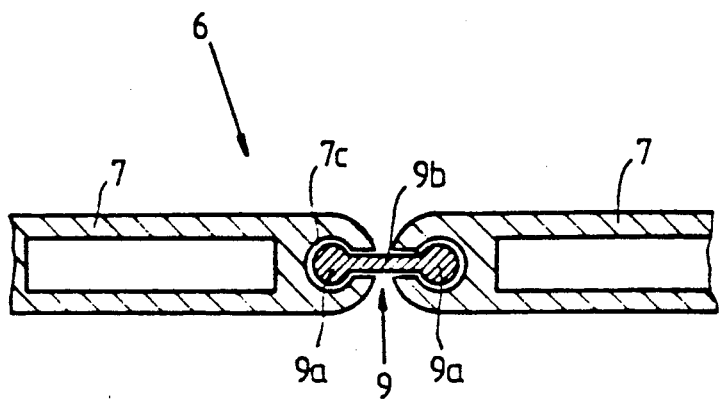
FIG. 4 shows a longitudinal section through a part of an embodiment of the cover.

In the embodiment of this type which is illustrated in FIG. 4 the individual identically constructed cover elements 7 are each provided on their two sides facing the adjacent cover elements with a coupling socket 7c formed in the cover element, and adjacent coupling elements are connected to one another by flexible links. These flexible links each have two cylindrical coupling bosses 9a and a connecting piece 9b arranged between them.

In the embodiment according to FIG. 4 the cover elements are advantageously made from extrusion-drawn metal, preferably aluminium, and the flexible links 9 from plastic. Naturally, the choice of other materials is also possible within the scope of the invention.

Figure 5:
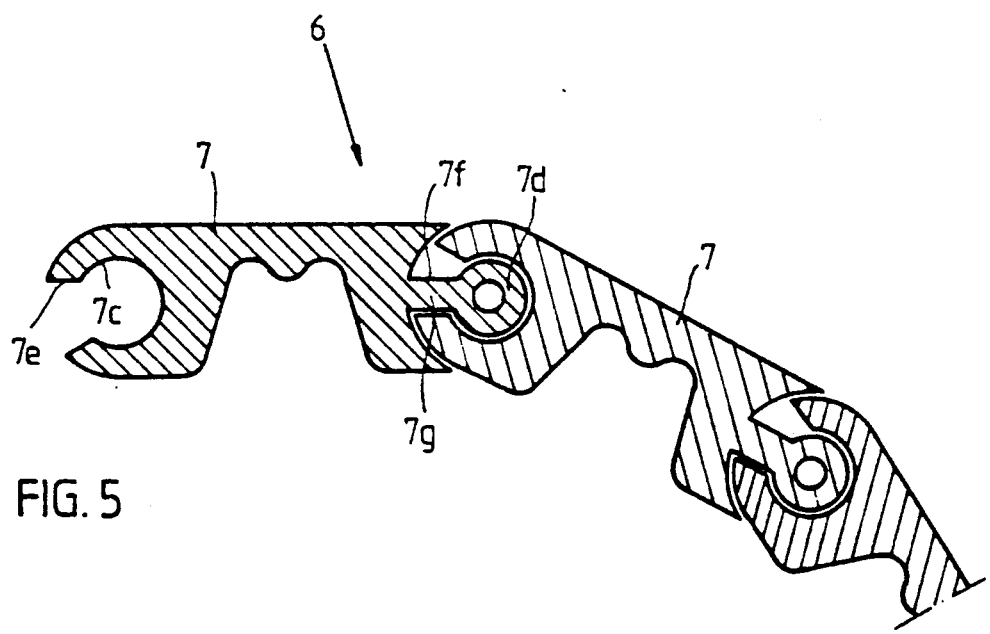
FIG. 5 shows a longitudinal section through a part of another embodiment of the cover.

FIG. 5 shows a variant of the cover 6 in which the individual identically constructed cover elements 7 are each provided with a cylindrical coupling boss 7d formed integrally on one of their two sides facing the adjacent cover elements and a cylindrical coupling socket 7c formed in the cover element on the other side.

In this embodiment, in the extended position and in the maximum curved position of the cover 6, surfaces 7e which define the coupling socket 7c towards the exterior and surfaces 7f which define a connecting piece 7g bearing the coupling boss 7d come to rest against one another like stops, as can be seen from FIG. 5.

The gaps between the surfaces 7e and 7f which co-operate like stops are covered towards the broad side of the cover 6 by the cylindrical surfaces of the coupling socket 7c and of the coupling boss 7d which co-operate with one another. Towards the outer sides (which lie parallel to the drawing plane of FIG. 5) the gaps can be closed by additional protective covers.

If a cover 6 according to FIG. 5 is used in conjunction with a hose body 1 according to FIG. 1, then this energy-conducting hose contains two separate stop systems which can be used either or individually or jointly to determine the extended position and/or the maximum curved position of the hose body. One stop system is formed by the locking bands 4 described with the aid of FIG. 6 and the C-shaped hose elements 2 which come into contact with one another in the curved state of the hose body, whilst the second stop system is formed by the cover 6 according to FIG. 5.

The conditions could be chosen for example so that the two stop systems come to a stop simultaneously, thus supporting one another or so that first of all, only the stop system formed by the cover 6 is operative, which facilitates the relieving of strain and the gentle treatment of the hose body 1 which is frequently required.

It is also possible within the scope of the invention to dispense completely with the use of locking bands 4 (FIG. 6) and to transfer the function of fixing the extended position to the cover 6. The variant of the cover 6 illustrated in FIG. 5 can be used, for example for such a construction. In this case the cover 6 is releasably connected at least to some hose elements, preferably to hose elements at the two ends of the hose body 1. In this way the cover 6 fixes the extended or compressed position of the hose body on the side of the hose body which is provided with the slot 3.

The connection of the cover 6 to the hose elements 2 at the beginning and end of the energy-conducting hose, for example by screws, clamps or other releasable connecting means is released if the cover 6 is to be removed from the hose body 1.

Figure 7:
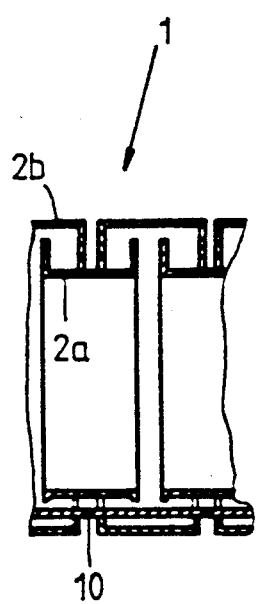
FIG. 7 shows a longitudinal section through a part of a second embodiment of the hose body.

FIG. 7 shows a further variant of a hose body 1 which can be used for the energy-conducting hose according to the invention. In this case internal C-shaped hose elements 2a are used which have the cross-sectional shape of a U which is open towards the outside, as well as outer C-shaped hose elements 2b which have the cross-sectional shape of a U which is open towards the inside. Two adjacent outer hose elements 2b in each case engage in an inner hose element 2a and conversely two adjacent inner hose elements 2a engage in an outer hose element 2b.

On the interior of the curve of the hose at the bottom in FIG. 7 a tension element 10 is arranged between the inner and outer hose elements 2a, 2b, is placed under tensile stress in the extended position of the hose and prevents bending of the hose towards the opposite side.

The hose body 1 according to FIG. 7 also has a slot running in the longitudinal direction which is closed by a cover consisting of individual cover elements.

Moreover, in the energy-conducting hose according to the invention a number of other measures can be adopted which are already known from another context. Thus it is possible to limit the radius of curvature of the hose by inserting locking elements into the outer spaces between adjacent hose element on the inside of the curve or by creating such locking elements by deformation of the hose elements in order in this way to be able to produce energy-conducting hoses with differing radii of curvature using similar basic elements.

Furthermore, if required a cable-protecting hose provided with a slide fastener can be placed in the space enclosed by the hose body 1 and the cover 6. It is also possible to use a helical band which encloses the cables.

While the foregoing embodiments of the invention have been shown and described in detail, it should be understood by those skilled in the art that variations and modifications of the disclosed embodiments can be made without departing from the spirit and scope of the invention.

I claim:

1. An energy conducting longitudinally extending hose for carrying energy and hydraulic lines between a fixed connection and a movable consuming device, said hose comprising:

a hose body having a side and first and second ends which can be bent to an extended position, a maximum curved position, and a compressed position, comprising C-shaped hose elements which are movable relative to one another and which has a slot running in a longitudinal direction of the hose, said slot having first and second edges, a cover which is movably mounted to said slot edges and releasably closes the slot, said cover comprising individual cover elements having first and second sides and first and second ends which succeed one another in the longitudinal direction of the energy conducting hose, each of said cover elements having a recess in each of said sides for receiving said slot edges to retain and guide the cover elements on the hose body, and means on each end of each of said covers for linking adjacent cover elements.

2. The energy conducting hose as claimed in claim 1, wherein said individual cover elements are arranged freely adjacent one another.

3. An energy conducting hose, comprising:

a hose body which can be bent between an extended position and a maximum curved position, comprising C-shaped hose elements which are movable relative to one another and having a slot running in a longitudinal direction of the hose, the slot having first and second edges, a cover which is guided by the slot edges and releasably closes the slot, and wherein the cover comprises a plurality of similar adjacent cover elements having first and second sides which succeed one another in the longitudinal direction of the energy conducting hose and are each provided adjacent the two slot edges with a recess intended for retaining and guiding the cover elements on the hose body, said individual cover elements being connected to one another so as to be capable of limited swivelling movement.

4. The energy conducting hose as claimed in claim 3, wherein the adjacent cover elements are connected to one another so as to be capable of limited swivelling movement in each case by means of a cylindrical coupling boss and a hollow cylindrical coupling socket.

5. The energy conducting hose as claimed in claim 4, wherein the individual cover elements are each provided with a cylindrical coupling boss formed integrally on one of their two sides facing the adjacent cover elements and a cylindrical coupling socket formed in the cover element on the other side.

6. The energy conducting hose as claimed in claim 4, wherein the cover elements are each provided on their two sides facing the adjacent cover elements with a coupling socket formed in the cover element, and adjacent coupling elements are connected to one another by flexible links which each have two cylindrical coupling bosses and a connecting piece arranged between them.

7. The energy conducting hose as claimed in claim 1, wherein said first and second edges of said slot are on two narrow sides of said C-shaped hose elements and the recesses on the cover elements intended for retaining and guiding the cover elements open on said two outer narrow sides of the hose elements.

8. The energy conducting hose as claimed in claim 1, wherein said cover elements are formed with a broad side and a narrow side and the recesses provided on the cover elements for retaining and guiding the cover elements open on the broad side of the cover elements facing the interior of the hose body.

9. The energy conducting hose as claimed in claim 8, and wherein the cover elements have a width measured in the cross direction of the hose body which is greater than the width of the hose body.

10. An energy conducting hose comprising:

a hose body having a side and first and second ends which can be bent between an extended position and a maximum curved position, comprising C-shaped hose elements which are movable relative to one another and having a slot running in a longitudinal direction of the hose, the slot having first and second edges, a cover which is guided by the slot edges and releasably closes the slot, and wherein the cover comprises adjacent individual cover elements which succeed one another in the longitudinal direction of the energy conducting hose and are each provided adjacent the two slot edges with a recess intended for retaining and guiding the cover elements on the hose body, in said two slot edges a locking band is provided which is firmly connected at least to some hose elements and fixes the extended or compressed position of the hose body on the side of the hose body which is provided with the slot.

11. The energy conducting hose as claimed in claim 1, and wherein the cover is releasably connected at least to some hose elements, of the hose body, and fixes the extended or compressed position of the hose body on the side of the hose body which is provided with the slot.

12. The energy conducting hose as claimed in claim 1, and wherein the recesses provided in the cover elements are at least partially lined with sliding material.

13. An energy conducting hose, comprising:

a hose body which can be bent between an extended position and a maximum covered position, comprising C-shaped hose elements which are movable relative to one another and having a slot running in a longitudinal direction of the hose, the slot having first and second edges, a cover which is guided by the slot edges and releasably closes the slot, and wherein the cover comprises a plurality of adjacent individual cover elements having first and second sides which succeed one another in the longitudinal direction of the energy conducting hose and are each provided adjacent the two slot edges with a recess intended for retaining and guiding the cover elements on the hose body, said individual cover elements are connected to one another by means of a cylindrical coupling boss and a hollow cylindrical coupling socket, whereby the individual cover elements are each provided with a cylindrical coupling bond formed integrally on one of the two sides facing adjacent cover elements and the cylindrical coupling socket formed in the cover element on the other side so as to be capable of limiting swivelling movement, and whereby the extended position and/or the maximum curved position of the hose body is limited by cooperating stop surfaces of the adjacent cover elements.

14. An energy conducting hose, comprising:

a hose body having an interior and an exterior which can be bent between an extended position and a maximum curved position, comprising C-shaped hose elements which are movable relative to one another and having a slot running in a longitudinal direction of the hose, the slot having first and second edges, a cover which is guided by the slot edges and releasably closes the slot, said cover comprises individual cover elements which succeed one another in the longitudinal direction of the energy conducting hose and are each provided adjacent the two slot edges with a recess intended for retaining and guiding the cover elements on the hose body, wherein said C-shaped hose elements comprise inner C-shaped elements which have the cross-sectional shape of a U which is open towards the exterior, outer C-shaped hose elements which have the cross-sectional shape of a U which is open towards the interior, in which two adjacent C-shaped outer hose elements engage an inner C-shaped hose element and two adjacent inner C-shaped hose elements engage an outer C-shaped hose element, and further comprising at least one tension element which is arranged on the interior of the hose when the hose is in its curved position between the inner and outer hose elements and is connected to the beginning and the end of the hose, and is placed under tensile stress in the extended position of the hose and prevents bending of the hose.

* * * * *